(12) United States Patent
Menge

(10) Patent No.: US 9,753,148 B2
(45) Date of Patent: Sep. 5, 2017

(54) RADIATION SENSOR AND METHODS OF DETECTING A TARGETED RADIATION USING THE RADIATION SENSOR

(71) Applicant: Saint-Gobain Ceramics & Plastics, Inc., Worcester, MA (US)

(72) Inventor: Peter R. Menge, Novelty, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 86 days.

(21) Appl. No.: 14/709,039

(22) Filed: May 11, 2015

(65) Prior Publication Data

US 2015/0338526 A1 Nov. 26, 2015

Related U.S. Application Data

(60) Provisional application No. 62/001,810, filed on May 22, 2014.

(51) Int. Cl.
*G01T 1/17* (2006.01)
*G01T 3/00* (2006.01)
*G01T 1/00* (2006.01)

(52) U.S. Cl.
CPC .............. *G01T 1/17* (2013.01); *G01T 1/00* (2013.01); *G01T 3/00* (2013.01)

(58) Field of Classification Search
CPC .... G01T 1/17; G01T 1/29; G01T 3/00; G01T 3/001; G01T 1/2985
See application file for complete search history.

(56) References Cited

U.S. PATENT DOCUMENTS

| 5,641,973 | A | 6/1997 | Shigenaka et al. |
| 2007/0273538 | A1* | 11/2007 | Holder ................ G01T 1/167 340/600 |
| 2009/0148375 | A1* | 6/2009 | Bourret-Courchesne .......... C01G 27/00 423/263 |
| 2010/0186794 | A1 | 7/2010 | Chen et al. |
| 2012/0121067 | A1* | 5/2012 | Hayden ................ G01T 1/2018 378/62 |
| 2012/0138887 | A1 | 6/2012 | Zhang et al. |

OTHER PUBLICATIONS

Caltech Senior Physics Laboratory, "Plastic Scintillators and Fast Pulse Techniques," Physics 77, Experiment 13, Sep. 1996, pp. 1-21.

* cited by examiner

*Primary Examiner* — Marcus Taningco
(74) *Attorney, Agent, or Firm* — Abel Law Group, LLP; Robert N. Young

(57) ABSTRACT

A radiation sensor can include a body configured to capture targeted radiation. In an embodiment, the body can include a topological insulator material. In another embodiment, the radiation sensor can further include a controllable magnetic source configured to generate a magnetic field that is received by the body. The radiation sensor can be used to detect the targeted radiation. In an embodiment, detecting the targeted radiation can be done in not greater than 100 ns.

20 Claims, 1 Drawing Sheet

RADIATION SENSOR AND METHODS OF DETECTING A TARGETED RADIATION USING THE RADIATION SENSOR

CROSS-REFERENCE TO RELATED APPLICATION

This application claims priority under 35 U.S.C. §119(e) to U.S. Patent Application 62/001,810 entitled "Radiation Sensor And Method Of Detecting A Targeted Radiation Using The Radiation Sensor," by Menge, filed May 22, 2014, which is assigned to the current assignee hereof and incorporated herein by reference in its entirety.

FIELD OF THE DISCLOSURE

The present disclosure generally relates to a radiation sensor and methods of detecting a targeted radiation using the radiation sensor.

BACKGROUND

Scintillators have been widely used in detecting radiation. In applications where extremely fast timing measurements are required, such as positron emission tomography (PET) imaging, neutron gauging and multiplicity, ultra fast scintillators may be desired. Materials used for the ultra fast scintillators can have a very fast luminescent-decay time of about 2 ns. However, scintillator materials that can generate a pulse length of less than 1 ns in response to a radiation strike have not been discovered. Industries keep seeking faster radiation detecting devices for the extremely fast timing measurements.

BRIEF DESCRIPTION OF THE DRAWINGS

Embodiments are illustrated by way of example and are not limited by the accompanying figures.

DETAILED DESCRIPTION

Figure 1:
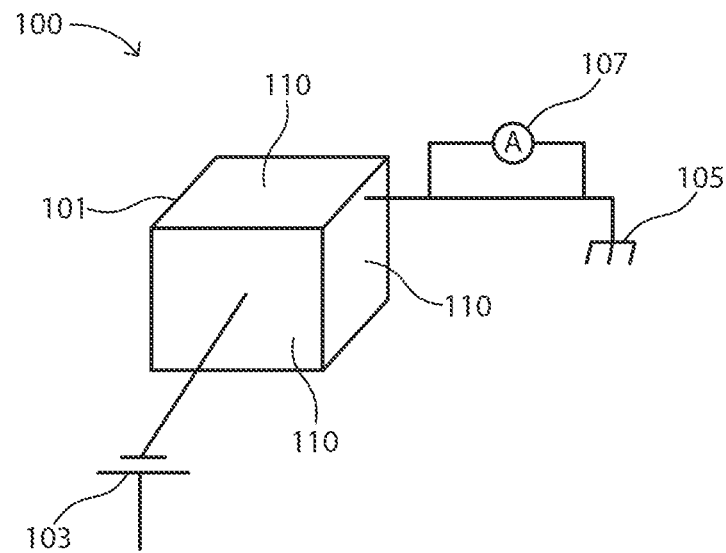
FIG. 1 illustrates a radiation sensor in accordance with an embodiment disclosed herein.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The term "a targeted radiation" as used herein refers to a radiation including a gamma ray, an x-ray, a fast neutron, a thermal neutron, an ionizing particle, such as an alpha particle or a beta particle, or any combination thereof.

The term "chalcogenide" as used herein is intended to mean a chemical compound including a chalcogen anion of Group 16 of the International Union of Pure and Applied Chemistry (IUPAC) periodic table of the element, other than an oxygen anion. For example, a chalcogenide may include a sulfide, a selenide, or a telluride but may not include an oxide.

The terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the radiation detection art.

A radiation sensor disclosed herein can include a body capable of capturing targeted radiation. In an embodiment, the body can include a topological insulator material. In another embodiment, the body can change a resistivity in response to capturing the targeted radiation. In a further embodiment, the radiation sensor can include an input and an output terminal, a magnetic source, or a combination thereof to facilitate detection of the change of the resistivity, which indicates capture of the targeted radiation. Detecting the targeted radiation using the radiation sensor may be performed in not greater than 100 ns.

Referring to FIG. 1, a radiation sensor 100 is illustrated. The radiation sensor 100 can include a body 101 that is configured to capture the targeted radiation. The body can include a bulk and at least one surface, such as surfaces 110 as illustrated in FIG. 1. The body can be cubic as depicted in FIG. 1, cylindrical, spherical, or have any other shape as desired by a skilled artisan for a particular application of the radiation sensor.

The body described herein has a length, a width, and a depth. In an embodiment, the width and the length of the body can be at least 12 mm (0.5 inch), at least 25 mm (1 inch), or at least 50 mm (2 inches). In another embodiment, the single body may have the width and the length of not greater than 203 mm (8 inches), not greater than 152 mm (6 inches), or not greater than 101 mm (4 inches). In a further embodiment, the width and the length of the single body in the radiation sensor can be in a range of 12 mm to 200 mm or in a range of 25 mm to 150 mm. In still another embodiment, the body can have a depth of at least 12 mm (0.5 inches), such as at least 25 mm (1.0 inches), at least 50 mm (2.0 inches), or at least 100 mm (4.0 inches). In another embodiment, the depth of the body may be not greater than 250 mm (10.0 inches). For example, the depth of the body may be in a range of between 12 mm to 250 mm. After reading the present disclosure, a skilled artisan will understand that the width, length and depth of the body can be within any of the minimum and maximum values disclosed herein for the width, length and depth, respectively.

In an embodiment, the body 101 can include a topological insulator material. In a particular embodiment, the body can consist substantially of a topological insulator material. In another embodiment, the surface of the body can be electrically conductive, for example, the surface can have a metallic state. The bulk of the body can be an electrical insulator.

In a further embodiment, the body 101 can include a chalcogenide, an oxide, or the like. The chalcogenide can also include an element that does not belong to Group 16, such as Bi, Sb, Pb, Cd, Hg, Ti, or any combination thereof. In a further embodiment, the chalcogenide can include CdTe/HgTe/CdTe, AlSb/InAs/GaSb/AlSb, $Bi_{1-x}Sb_x$ (0.09≤x≤0.23), Sb, $Bi_2Se_3$, $Bi_2Te_3$, BiTeCl, $Sb_2Te_3$, $Bi_2Te_2Se$, $(Bi,Sb)_2Te_3$, $Bi_{2-x}Sb_xTe_{3-y}Se_y$, (y≥1), $Bi_2Te_{1.6}S_{1.4}$, $Bi_{1.1}Sb_{0.9}Te_2S$, $Sb_2Te_2Se$, $Bi_2(Te,Se)_2(Se,S)$, $TlBiSe_2$, $TlBiTe_2$, $TlBi(S,Se)_2$, $PbBi_2Te_4$, $PbSb_2Te_4$, $GeBi_2Te_4$, $Ge_2BiTe_5$, $PbBi_4Te_7$, $GeBi_{4-x}SbxTe_7$, $(PbSe)_5(Bi_2Se_3)_6$, $(Bi_2)(Bi_2Se_{2.6}S_{0.4})$, $(Bi_2)(Bi_2Te_3)_2$, SnTe, $Pb_{1-x}Sn_xTe$, $Pb_{0.77}Sn_{0.23}Se$, Bi bilayer, $Ag_2T$, $SmB_6$, $Bi_{14}Rh_3I_9$, RBiPt(R=Lu, Dy, Gd), and so on. In a particular embodiment, the chalcogenide can include $Bi_2Se_3$, $Bi_2Te_3$, $Sb_2Te_3$, $SmB_6$, $Bi_2Te_2Se$, $(Bi,Sb)_2Te_3$, $(Bi_2)(Bi_2Te_3)_2$, $Bi_{1.1}Sb_{0.9}Te_2S$ or the like. Examples of the oxide can include $Nd_2(Ir_{1-31\ x}Rh_2)_2O_7$, and so on.

In an embodiment, the body 101 can be monocrystalline. In another embodiment, the body may be doped. Dopant may help to change property of the body or obtain desired property for certain applications. For example, a dopant can be included in at least one of the surfaces to change conductivity and/or resistivity as desired. In a particular embodiment, the surface can be doped without affecting topological insulating property. Examples of the dopant can include an alkali or a magnetic dopant. In a further embodiment, the dopant can include Na, Cr, V, Mn, Fe, Cu, or any combination thereof. In another embodiment, the dopant can be at a concentration of at least 0.01 wt % of a total weight of the body. In another embodiment, the dopant may be not greater than 5 wt %. In still another embodiment, the dopant can be in a range of 0.01 wt % to 5 wt %.

In another embodiment, as desired by a skilled artisan, the body may include an impurity content of not greater than 0.0001 wt % as compared to a total weight of the body. For example, the impurity content may be not greater than 0.00001 wt % or not greater than 0.000001 wt %.

In still another embodiment, the radiation sensor disclosed herein can include an array of the bodies, each similar to the body disclosed above. For example, the radiation sensor can include a 2-D array having a size of at least 2×2 bodies, such as 3×3 bodies, 4×4 bodies, 8×8 bodies, 16×16 bodies, 32×32 bodies, 64×64 bodies, or the like. In another embodiment, the array may have a dissimilar number of bodies along the rows and columns, for example 2×8 bodies, 8×16 bodies, or the like. After reading this specification, a skilled artisan will understand that the size of the array can vary depending on a particular application of the radiation sensor and can be larger than 64×64 bodies.

In a further embodiment, each of the bodies in the array can be substantially identically sized. After reading the present disclosure, a skilled artisan will understand that the width and the length of each body in the array can be different from the width and the length described above. For example, the width and the length can be at least 1 mm (0.04 inches), such as at least 2 mm (0.08 inches) allowing easy handling of the bodies. In another embodiment, the width and the length of the bodies in the array may be not greater than 15 mm (0.6 inches). For example, the width and the length may be not greater than 9 mm (0.35 inches). In a particular embodiment, the width and the length of each body can be substantially the same. For example, the width and the length of the bodies in the array may be in a range of between 1 mm to 15 mm, or in a range of between 2 mm to 9 mm.

In still another embodiment, the radiation sensor 100 can include an input terminal 103 and an output terminal 105. The input and output terminals can be coupled to different surfaces or the same surface of the body 101. In yet another embodiment, a voltage difference or an electric field can be applied along the body 101 to induce a current on the surface. The radiation sensor 100 can further include a current sensor, such as an ammeter 107, which can be used to detect a change of the current.

Figure 2:
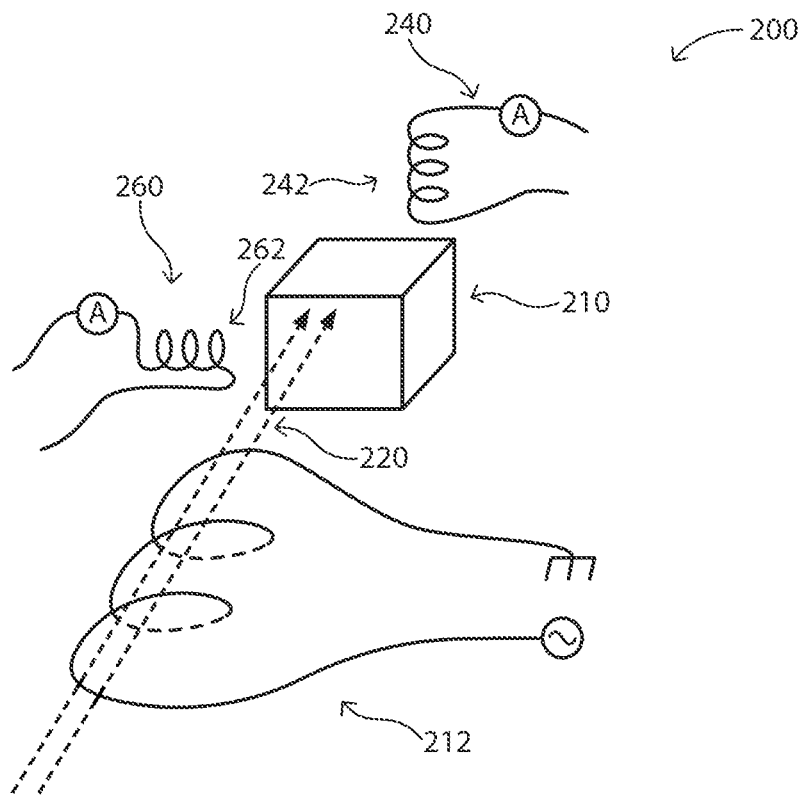
FIG. 2 illustrates a radiation sensor in accordance with another embodiment disclosed herein.

In yet another embodiment, as illustrated in FIG. 2, the radiation sensor 200 can include a body 210 similar to the body disclosed above and a magnetic source 212 that can generate a magnetic field 220. In a particular embodiment, the magnetic source can be controllable and generate a changing magnetic field. For example, as depicted in FIG. 2, the magnetic source can include a coil, and a changing current can flow along the coil to generate the changing magnetic field. In a further embodiment, the magnetic field 220 can be applied to the body 210 to induce a current on the surface of the body. As illustrated in FIG. 2, the body 210 can be placed in the magnetic field with at least one surface being perpendicular to the direction of the magnetic field. Alternatively, the body can be placed inside the coil such that the coil surrounds the body, which may help to uniformly apply the changing magnetic field to the body. In a particular embodiment, the applied magnetic field can induce a current on a surface of the body, and the current can induce a different magnetic field. In a further embodiment, the radiation sensor 200 can include a magnetic field perturbation sensor, such as the sensors 240 and 260, placed close to the body 210 to receive the magnetic field induced by the current on the surface of the body. As illustrated in FIG. 2, the magnetic field perturbation sensor 240 and 260 can include a coil 242 and 262, respectively. The magnetic field perturbation sensor can further include a current senor, such as an ammeter, coupled to the coil. In a particular embodiment, the coil 242 and 262 can be placed such that the plane of each coil is perpendicular to the flow of the current on the surface of the body. In another embodiment, the radiation sensor can include one, two, or more magnetic field perturbation sensors such that each surface of the body is close to a magnetic field perturbation sensor, which may help to increase detection sensitivity of a perturbation of the applied magnetic field, the induced magnetic field, or both of the magnetic fields.

In a further embodiment, for the radiation sensor including an array of the bodies, at least one of the bodies can be coupled to an input terminal and an output terminal. For example, at least one third, at least half, or each of the bodies in the array is coupled to the input and output terminals. The array may include a plurality of sets of input and output terminals depending on the size of the array. For example, a set of input and output terminals can be coupled to a row of bodies, and a different set of input and output terminals can be coupled to a column of bodies. In another embodiment, the columns of the array can be coupled to a set of input and output terminals, and the rows of the array can be coupled to a different set of terminals. After reading this disclosure, a skilled artisan will understand, as desired, the different bodies in the array can be coupled to a different set of input and output terminals. In a particular embodiment, the array can be a cross-point array, in which current along surfaces of a row of bodies can be detected separately from current along surfaces of a column of bodies, for example, by using separate current sensors. In a further embodiment, the radiation sensor can also include at least one current sensor to detect current on the surfaces of the bodies. In a particular embodiment, a separate current sensor can be used for each set of input and output terminals. In yet another embodiment, the radiation sensor may include a magnetic source as described above. In addition, the radiation sensor may further include a magnetic field perturbation sensor as disclosed above.

The radiation sensor disclosed herein can be used to detect the target radiation, such as a gamma ray, an X-ray, a neutron, an alpha particle, a beta particle, any other ionizing particle, or any combination thereof. In an embodiment, upon capturing the target radiation, the body can change certain characteristics. Detecting the changes of the characteristics can indicate detection of the target radiation, which may be performed in not greater than 100 ns. For example, the targeted radiation may be detected in not greater than 50 ns, or not greater than 10 ns. The fast detection of the target radiation makes the radiation sensor disclosed herein suitable for applications requiring fast timing For example, the radiation sensor can be used in positron emission tomography (PET), high count rate applications such as pulsed neutron activation and areas of high radioactivity, neutron multiplicity counters, Compton imagers, associated particle imagers, and so on.

In another embodiment, upon capturing the targeted radiation, the body can change a resistivity. For example, the interaction between the captured radiation and the bulk of the body can result in generation of electron-hole pairs and charge carriers that decrease the resistivity of the bulk. In a further embodiment, the body can also change the resistivity of at least one surface as a result of capturing the targeted radiation. For example, the resistivity of the surface can increase. In a particular embodiment, decreasing the resistivity of the bulk may cause an instantaneous increase of the resistivity of at least one of the surfaces. In a further embodiment, the magnitude of the resistivity increase can be correlated to the number of initial charge carriers, which, in turn, can be correlated to the energy deposited in the bulk by the radiation.

As disclosed above, a voltage difference or an electric field can be applied across the body of the radiation sensor to induce the current on at least one of the surfaces, which also can be used to detect the targeted radiation. For example, upon capturing the targeted radiation, the induced current can change, for example, decrease as a result of increased resistivity, which can be immediately detected by the current sensor. The detection of the change of the current can indicate detection of the targeted radiation.

Similarly, as disclosed above, a magnetic field can be applied to the body of the radiation sensor to induce a current on at least one of the surfaces of the body. In an embodiment, the current can in turn generate a different magnetic field that can induce a current in the magnetic field perturbation sensor. In a further embodiment, the capture of the targeted radiation in the body causes a decrease of the current on the surface, which in turn can lead to a perturbation of the magnetic field induced by the current and change the current along the magnetic field perturbation sensor. The change of the current of the magnetic field perturbation sensor can be used to detect the perturbation of one or both of the magnetic fields and to indicate detection of the targeted radiation.

A skilled artisan will understand that the radiation sensor disclosed herein can include the input and output terminals, the current sensor, the magnetic source and the magnetic sensor so that a user of the radiation sensor can choose any of the detecting methods as desired to detect the targeted radiation.

Detecting the targeted radiation with the radiation sensor described herein does not require a photodetector, such as a photomultiplier tube or a photodiode, and thus, reduces technical complexity which may help to simplify the process and reduce cost of detection of the targeted radiation. Further, the radiation sensor allows a fast detection of the targeted radiation, for example, not greater than 100 ns, faster than many other radiation detectors used in the art, such as a scintillator. The characteristics of the radiation sensor disclosed herein make it suitable for applications that require fast timing measurement.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below. Embodiments may be in accordance with any one or more of the items as listed below.

Item 1. A radiation sensor, comprising a body including a topological insulator material, wherein the body is configured to capture a targeted radiation.

Item 2. A radiation sensor, comprising:
 a body configured to capture a targeted radiation; and
 a first controllable magnetic source configured to generate a magnetic field that is received by the body.

Item 3. A method of detecting a targeted radiation using a radiation sensor, comprising:
 capturing the targeted radiation within a body of the radiation sensor; and
 detecting the capture of the targeted radiation in not greater than 100 ns.

Item 4. A method of detecting a targeted radiation using a radiation sensor, comprising:
 capturing the targeted radiation within a body of the radiation sensor;
 applying a voltage difference across the body; and
 sensing a decrease in current.

Item 5. A method of detecting a targeted radiation using a radiation sensor, comprising:
 capturing the targeted radiation within a body of the radiation sensor;
 applying a first magnetic field to the body; and
 detecting a perturbation of the first magnetic field in response to capturing the targeted radiation.

Item 6. A method of detecting a targeted radiation using a radiation sensor, comprising:
 capturing the targeted radiation within a body of the radiation sensor; and
 increasing a resistivity of a surface of the body in response to capturing the targeted radiation.

Item 7. The method of any one of items 4 to 6, further comprising detecting the capture of the targeted radiation in not greater than 100 ns.

Item 8. The method of item 3 or 6, further comprising:
 applying a voltage difference across the body; and
 sensing a decrease in current.

Item 9. The method of item 3 or 6, further comprising:
 applying a first magnetic field to the body; and
 detecting a perturbation of the first magnetic field in response to capturing the targeted radiation.

Item 10. The method of any one of items 3 and 7 to 9, further comprising detecting the capture of the targeted radiation in not greater than 10 ns.

Item 11. The method of any one of items 3, 5 to 7, 9, and 10, further comprising sensing a decrease in current.

Item 12. The method of any one of items 5 and 9 to 11, further comprising applying a magnetic field perturbation sensor to detect the perturbation of the applied magnetic field.

Item 13. The method of any one of items 3 to 5 and 7 to 12, further comprising increasing a resistivity of a surface of the body in response to capturing the targeted radiation.

Item 14. The method of any one of items 4 to 13, further comprising measuring energy of the targeted radiation.

Item 15. The method of item 14, wherein measuring the energy of the targeted radiation comprises:

correlating increase of resistivity of the body to the energy of the targeted radiation.

Item 16. The radiation sensor of item 1 or 2, wherein the body is configured to increase a resistivity in response to capturing the targeted radiation.

Item 17. The radiation sensor or the method of any one of items 2 to 16, wherein the body comprises a topological insulator material.

Item 18. The radiation sensor or the method of any one of items 1 to 17, further comprising:

an input terminal coupled to a first surface of the body; and an output terminal coupled to a second surface of the body.

Item 19. The radiation sensor or the method of any one of the preceding items, wherein the radiation sensor comprises an array of the bodies, each body including a topological insulator material and configured to decrease a resistivity in response to capturing a targeted radiation.

Item 20. The radiation sensor or the method of item 19, wherein a first surface and a second surface of at least one of the bodies are coupled to an input terminal and an output terminal, respectively.

Item 21. The radiation sensor or the method of item 18, 19 or 20, wherein the radiation sensor further comprises a current sensor coupled to the input terminal or the output terminal.

Item 22. The radiation sensor or the method of any one of items 1 and 3 to 17, further comprising a first controllable magnetic source configured to generate a magnetic field that is received by the body.

Item 23. The radiation sensor of item 2 or 22, comprising a magnetic field perturbation sensor configured to detect a perturbation of the first magnetic field.

Item 24. The radiation sensor or the method of any one of the preceding items, wherein the body comprises a bulk and at least one surface, the bulk being an electrical insulator and the surface being electrically conductive.

Item 25. The radiation sensor or the method of any one of the preceding items, wherein the body comprises a chalcogenide.

Item 26. The radiation sensor or the method of any one of the preceding items, wherein the body comprises Bi, Sb, Te, Pb, Cd, Hg, Ti, or any combination thereof.

Item 27. The radiation sensor or the method of any one of the preceding items, wherein the body comprises $Bi_2Se_3$, $Bi_2Te_3$, $Sb_2Te_3$, $SmB_6$, or any combination thereof.

Item 28. The radiation sensor or the method of any one of the preceding items, wherein the body consists essentially of a topological material.

Item 29. The radiation sensor or the method of any one of the proceeding items, wherein the body is monocrystalline having an impurity content of not greater than 0.0001 wt % of a total weight of the body.

Item 30. The radiation sensor or the method of item 1, 17, or 28, wherein the topological insulator material comprises a dopant including Na, Cr, V, Mn, Fe, Cu, or any combination thereof.

Item 31. The radiation sensor or the method of any one of the preceding items, wherein the targeted radiation comprises a gamma ray, a neutron, an alpha particle, a beta particle, an X-ray, or any combination thereof.

Item 32. A positron emission tomography system, comprising a radiation sensor of any one of items 1, 2, and 16 to 31.

Item 33. A neutron spectroscopy, comprising a radiation sensor of any one of items 1, 2, and 16 to 31.

Item 34. A nuclear gauging device, comprising a radiation sensor of any one of items 1, 2, and 16 to 31.

Item 35. A neutron multiplicity counter, comprising a radiation sensor of any one of items 1, 2, and 16 to 31.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all of the items.

What is claimed is:

1. A radiation sensor, comprising a body including a topological insulator material, wherein the body is configured to capture a targeted radiation including a gamma ray, a neutron, an alpha particle, a beta particle, an X-ray, or any combination thereof, and wherein the radiation sensor is configured to detect the targeted radiation in not greater than 100 ns.

2. The radiation sensor of claim 1, further comprising:

an input terminal coupled to a first surface of the body; and an output terminal coupled to a second surface of the body.

3. The radiation sensor of claim 2, further comprising a current sensor coupled to the input terminal or the output terminal.

4. The radiation sensor of claim 1, wherein the body comprises a bulk and at least one surface, the bulk being an electrical insulator and the surface being electrically conductive.

5. The radiation sensor of claim 1, wherein the radiation sensor comprises an array of the bodies, each body having a width, length, and depth.

6. A nuclear gauging device, comprising the radiation sensor of claim 1.

7. A neutron multiplicity counter, comprising the radiation sensor of claim 1.

8. A positron emission tomography system, comprising the radiation sensor of claim 1.

9. A neutron spectroscopy, comprising the radiation sensor of claim 1.

10. A radiation sensor, comprising:
a body configured to capture a targeted radiation including a gamma ray, a neutron, an alpha particle, a beta particle, an X-ray, or any combination thereof, wherein the body comprises a topological insulator material; and
a first controllable magnetic source configured to generate a magnetic field that is received by the body,
wherein the radiation sensor is configured to detect the targeted radiation in not greater than 100 ns.

11. The radiation sensor of claim 10, wherein the body comprises a chalcogenide.

12. The radiation sensor of claim 10, further comprising:
an input terminal coupled to a first surface of the body; and
an output terminal coupled to a second surface of the body.

13. The radiation sensor of claim 10, comprising a magnetic field perturbation sensor configured to detect a perturbation of the first magnetic field.

14. The radiation sensor of claim 10, wherein the radiation sensor comprises an array of the bodies, each body including a topological insulator material and configured to decrease a resistivity in response to capturing a targeted radiation.

15. The radiation sensor of claim 14, wherein:
a first surface and a second surface of at least one of the bodies are coupled to an input terminal and an output terminal, respectively; and
a current sensor is coupled to the input terminal or the output terminal.

16. A method of detecting a targeted radiation using a radiation sensor, comprising:
capturing the targeted radiation within a body of the radiation sensor, wherein the body comprises a topological insulator material; and
detecting the capture of the targeted radiation in not greater than 100 ns,
wherein the targeted radiation including a gamma ray, a neutron, an alpha particle, a beta particle, an X-ray, or any combination thereof.

17. The method of claim 16, further comprising measuring energy of the targeted radiation.

18. The method of claim 16, further comprising applying a voltage difference across the body, wherein detecting the capture of the targeted radiation comprises sensing a decrease in current.

19. The method of claim 16, further comprising applying a first magnetic field to the body, wherein detecting the capture of the targeted radiation comprises detecting a perturbation of the first magnetic field in response to capturing the targeted radiation.

20. The method of claim 16, further comprising increasing a resistivity of a surface of the body in response to capturing the targeted radiation.

* * * * *

UNITED STATES PATENT AND TRADEMARK OFFICE
CERTIFICATE OF CORRECTION

PATENT NO. : 9,753,148 B2
APPLICATION NO. : 14/709039
DATED : September 5, 2017
INVENTOR(S) : Peter R. Menge Page 1 of 1

It is certified that error appears in the above-identified patent and that said Letters Patent is hereby corrected as shown below:

In the Specification

Column 3, Line 22, delete "$Nd_2(Ir_{1-31x}Rh_2)_2O_7$" and insert therefore --$Nd_2(Ir_{1-x}Rh_x)_2O_7$--.

Signed and Sealed this
Twenty-fifth Day of September, 2018

Andrei Iancu
*Director of the United States Patent and Trademark Office*